July 4, 1939.                R. D. CHEESMAN                2,165,128
                                ROTARY KILN
                         Filed April 22, 1938            3 Sheets-Sheet 1
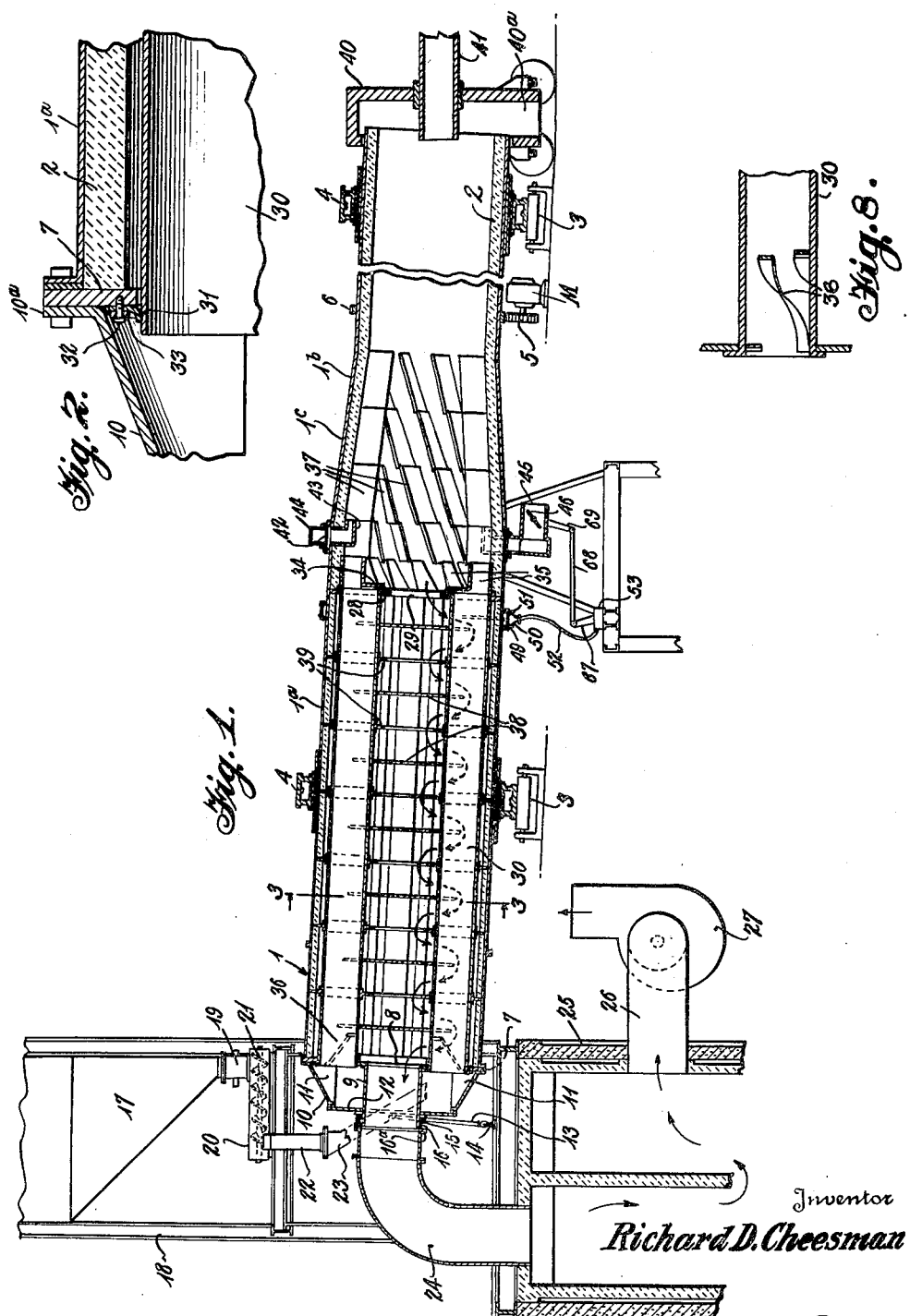
Inventor
Richard D. Cheesman
By
Attorney July 4, 1939.　　　R. D. CHEESMAN　　　2,165,128
ROTARY KILN
Filed April 22, 1938　　　3 Sheets-Sheet 2

Inventor
Richard D. Cheesman
By Eugene ︵︵︵︵
Attorney

Inventor
Richard D. Cheesman
By Eugene M. Ousey
Attorney

Patented July 4, 1939

2,165,128

UNITED STATES PATENT OFFICE 2,165,128

ROTARY KILN

Richard D. Cheesman, Allentown, Pa., assignor to Traylor Engineering and Manufacturing Company, Allentown, Pa., a corporation of Delaware Application April 22, 1938, Serial No. 203,669

11 Claims. (Cl. 263—33)

This invention relates to kilns of the rotary type and more especially to kilns suitable for the calcining of materials used in the manufacture of Portland cement and lime.

An important object of the invention is to provide a rotary kiln in which the heat of the combustion gases, which is ordinarily lost up the stack, is usefully employed to raise the temperature of the raw materials entering the kiln thus increasing the heating efficiency of the kiln and effecting a saving in its cost of operation.

More particularly, the invention contemplates the provision of a rotary kiln having a series of muffle tubes supported within and extending throughout a portion of its length adjacent its inlet end, and so constructed and arranged that the crushed or pulverized material to be treated is, during the initial stage of its passage through the kiln, indirectly heated by the combustion gases flowing through the kiln and deflected across the muffle tubes, and is then discharged into the open calcining section of the kiln upon the refractory lining of the kiln where it is directly exposed to the hot combustion gases and, subsequently, to the intense heat of the burner flame near the outlet end of the kiln.

Such a kiln construction results in the rapid and thorough heating of the material resulting from the deflection of the combustion gases at high velocity across the muffle tubes and also because of the greatly multiplied heating area presented by the tubes. The absorption of heat by the material is also accelerated because, during revolution of the kiln, the shallow bed of material within each tube is continuously being brought into contact with a new heated area upon the inside of the tube. Thus, not only is the time considerably shortened for properly conditioning the incoming material for exposure to the hot combustion gases and the burner flame in the combustion section of the kiln, but by occluding the combustion gases from the material until it has attained an elevated temperature, the extremely fine particles of material, which under ordinary conditions would be swept out of the kiln by the strong draft of combustion gases, coalesce to form larger and heavier particles. Not only does the recovery of these particles which were formerly lost up the stack result over a period of time in a noticeable saving, but the conservation of the heat which was heretofore dissipated through the escape of such hot particles from the kiln is another factor contributing to the more efficient and economical operation of the kiln.

It will be apparent that a kiln constructed in accordance with the present invention admits of a substantial increase in the velocity of the combustion gases sweeping the interior of the kiln with a consequent increase in heating efficiency. For controlling the velocity of such gases I provide, in the preferred form of my invention, a fan, blower or similar means in circuit with the kiln, such fan being regulatable to produce a flow of the gases properly correlated to the conditions of burner operation within the kiln. To insure the maximum transfer of heat therefrom to the tubes, baffles are advantageously provided within the kiln at spaced intervals therealong to deflect all the gases angularly across the muffle tubes and at an increased velocity.

Another object of my invention is to provide in a kiln of the multi-tube type, air admission ports extending through the wall of the kiln intermediate its ends and means for controlling the entrance of fresh air into the kiln through the ports in response to temperature conditions within the kiln. In this way, when the feed of material through the kiln is for any reason interrupted, overheating and consequent possible damage to the muffle tubes are avoided by the admission of cool outside air into the kiln.

A further object of the invention is to provide a kiln of the type including a plurality of longitudinally extending muffle tubes therein characterized by the fact that the muffle tubes are of generally sector shape in transverse cross-section. In its preferred form the invention contemplates the provision of discharge outlets for the tubes which are eccentrically located with respect to the longitudinal axis of the tubes and directed angularly relative to such axis so as to deliver the material from the tubes into engagement with the floor of the kiln diagonally and oppositely to the direction of rotation of the kiln.

Other objects and advantages will be apparent from the following detailed description of a preferred embodiment of the invention, reference being had to the annexed drawings, in which:

Figure 1 is a contracted view in longitudinal cross-section of a rotary kiln for the production of cement clinker in the manufacture of Portland cement;

Figure 2 is a fragmentary detail view of the inlet end of the kiln;

Figure 8 is a detail cross-sectional view of the forward end of a muffle tube showing the impeller vanes therein.

Figure 3:
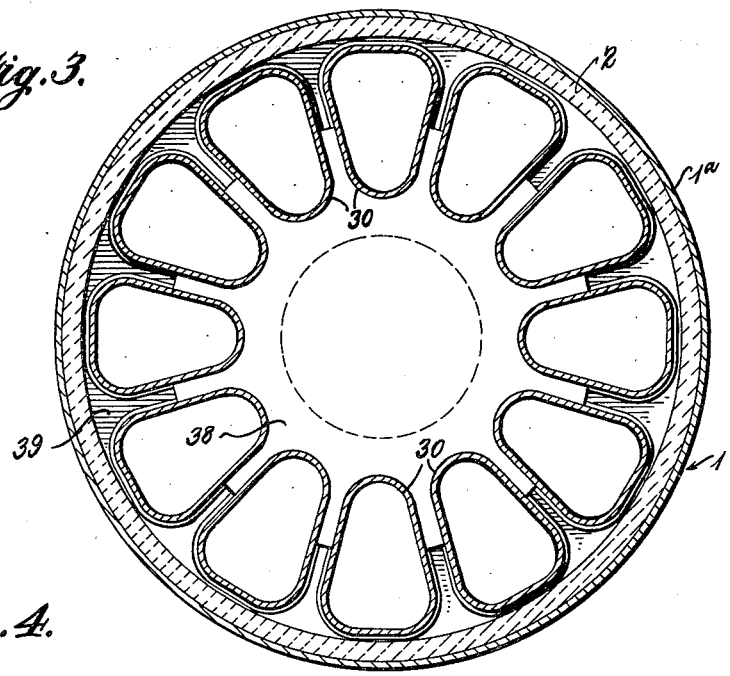
Figure 3 is a cross-sectional view of the inside of the kiln on the line 3—3 of Fig. 1 showing in cross-section the muffle tubes and the arrangement of the baffle plates therein.

The rotary kiln illustrated in the drawings comprises an elongated cylindrical metal shell 1 having an enlarged forward section 1a and a rear section 1b of somewhat smaller diameter but of greater length than the forward section, the two sections being connected by a tapered transition section 1c. The shell is interiorly lined throughout its length with fire-brick 2 or some other refractory material, the lining of section 1b, which constitutes the combustion chamber of the kiln, being somewhat thicker than the lining of section 1a which in effect forms a conditioning chamber for the material entering the kiln.

The kiln, in the customary manner, is supported at spaced intervals along its length upon rollers 3 which engage tires 4 encircling the shell. A pinion 5 driven from any suitable source of power, as for example the motor M, engages a ring gear 6 fastened to the circumference of the shell to impart rotary motion thereto. In order to feed the crushed or pulverized material through the kiln under the combined action of gravity and the agitation produced by rotation of the kiln, the kiln is disposed at a gentle downward slope from its inlet end toward its outlet end.

The elevated inlet end of the kiln is closed by a front header plate 7 secured to the end of the shell, this header plate being provided centrally with an enlarged opening 8. A sleeve 9 fastened to the header plate and surrounding the opening in the latter projects horizontally and axially outward from the end of the kiln. Also fastened to the forward end of the shell section 1a is an annular tapered casting 10 which latter is provided upon its larger end with a flange 10a bolted to the header plate 7. Upon its interior at circumferentially spaced intervals the tapered casting is provided with longitudinally inclined lifting blades 11. The opening presented by the restricted outer end of the casting is closed by a cover plate 12 non-rotatably supported on stanchions 13 which are pivoted at their lower ends to lugs 14. Compression springs 15 located intermediate the cover plate and a ring 16 encircling the outer end of the sleeve 9 urges the cover plate into bearing contact with the casting. By rocking the stanchions 13 rearwardly the cover plate may be shifted to uncover the opening in the tapered casting providing access to the forward end of the kiln.

The tapered casting 10 in conjunction with the front header plate 7 provides a compartment for the reception of the raw materials—for example, in the case of Portland cement, a mixture of crushed limestone and clay or shale—delivered to the kiln. This material is contained in a hopper 17 supported on a frame 18 located adjacent the forward end of the kiln and at an elevation above the kiln. A downspout 19 in the bottom of the hopper delivers material from the hopper to one end of a horizontally disposed conveyor trough 20 within which is a worm conveyor 21, driven by means not shown, which moves the material to the opposite end of the trough and discharges it into an opening communicating with a second downspout 22. The second downspout opens at its lower end into an inclined feed chute 23 which extends through an off-center opening in the cover plate 12 and discharges into the interior of the tapered casting.

The outer end of sleeve 9 communicates with a stationary offtake flue 24 which bends downwardly and opens into the top of a dust settling chamber 25. The ring 16 abuts a circumferential flange 16a on the end of the flue to seal the clearance space between the meeting ends of the sleeve and flue. A flue 26 communicating at one end with the settling chamber and exhausting at its other end to atmosphere has a suction fan 27 connected in circuit therewith which serves to induce a flow of air through the kiln, into the settling chamber and thence to outside the building.

A rear header plate 28 corresponding in all substantial respects to the front header plate 7, is fastened within the shell 1 immediately in advance of the tapered transition section 1c. The rear header plate has a large central opening 29 therein corresponding to the opening 8 in the front header plate. Extending between and opening through the front and rear header plates is a series of muffle tubes 30, represented in the drawings (Fig. 3) as twelve in number and circularly arranged about the axis of rotation of the kiln. These muffle tubes are of generally sector shape in transverse cross-section, as illustrated in Fig. 3 with their apices directed toward the axis of the kiln. The forward inlet ends of the tubes are made of ordinary steel plate while their discharge ends, which are more exposed to the intense heat of the combustion chamber, are made of heat-resistant steel.

Figure 5:
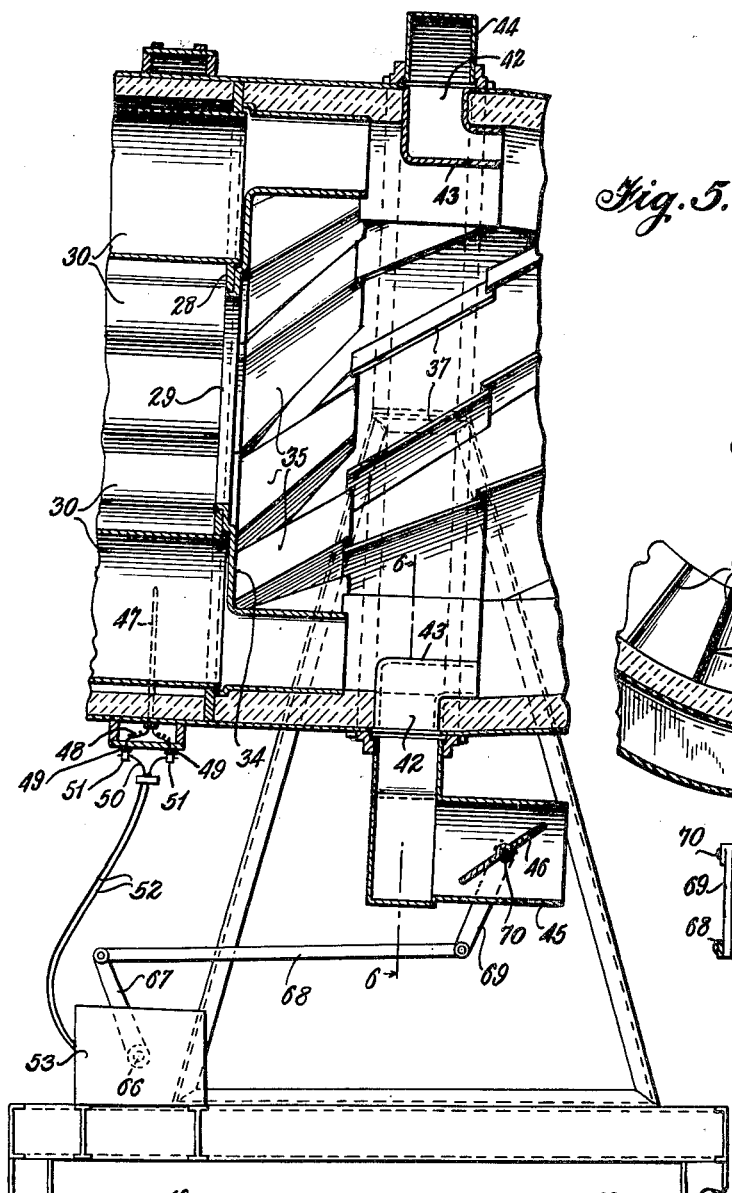
Figure 5 is a cross-sectional view through the kiln immediately in advance of the transition section showing the means for automatically controlling the temperature within the kiln.

The muffle tubes are welded to the rear header plate 28 while the forward ends of the tubes are free to slide in response to expansion and contraction within the openings provided for the tubes in the front header plate 7. As best shown in the detail view of Fig. 2 a sheet packing material 31 of an asbestos nature clamped by bolts 32 between the front header plate and a gasket 33 overlie and close the small clearance between the tubes and the openings in the header plate. Upon the discharge ends of the muffle tubes are welded caps 34 of heat-resistant steel, these caps having discharge openings offset from the longitudinal axes of the tubes and communicating with spouts 35, as best indicated in Fig. 5, arranged at a slant so as to direct the material issuing from the tubes along the inner wall of the kiln in a direction diagonally and crosswise of the direction of rotation of the kiln. Short helical vanes 36 are secured within the muffle tubes adjacent their inlet ends, the purpose of which vanes is to impel the material entering the tubes along the tubes and to prevent clogging of the inlet openings of the tubes with material fed to them by the sloped lifting vanes 11.

Figure 4:
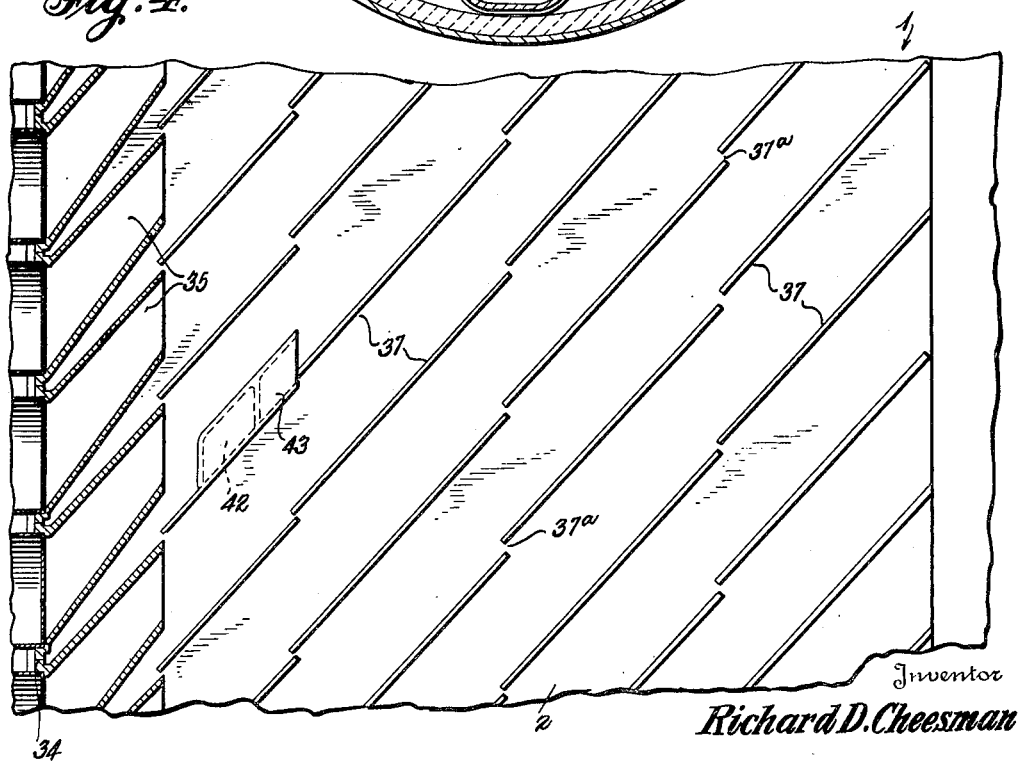
Figure 4 is a fragmentary detail view in longitudinal cross-section of the transition section of the kiln.

Upon the interior of the transition 1c of the kiln helical impeller blades 37 are provided, these blades extending at an angle of approximately 45 degrees along the wall of the kiln as indicated in Fig. 4. These blades are non-continuous, being interrupted at intervals as indicated at 37a for convenience of attachment to the kiln. By virtue of this construction material spilling from the ends of the tubes is spread by the lifting blades rearwardly into the combustion chamber of the kiln to avoid the piling up of material at the point of its discharge from the tubes.

The diameters of the conditioning chamber and the combustion chamber are preferably so selected as to produce a flow of gases through the former chamber at a substantially faster rate than through the latter chamber. That is, notwithstanding the larger diameter of the conditioning chamber, its effective cross-sectional area, excluding the space occupied by the muffle tubes therein, for the passage of the combustion gases is less than that of the combustion chamber. In order to expose the tubes to the total volume of the combustion gases flowing from the combustion chamber and direct these gases across the muffle tubes in an angular direction and at a still further increased velocity and thereby insure the more efficient heating of the material traveling through the tubes, a series of baffle disks 38 and baffle rings 39 are alternately arranged at spaced apart intervals within the kiln. The baffle disks 38 are peripherally notched, as shown in Fig. 3, to pass portions of the circumferences of the muffle tubes and these baffle disks block the passage through the kiln except for the narrow clearance spaces between the periphery of the baffle disks and the lining of the kiln. The baffle rings 39 each located midway between a pair of baffle disks and suitably supported on the shell are provided with openings through which the muffle tubes pass and with central openings corresponding in size to the openings 8 and 29 in the front and rear header plates. By reason of these baffle disks and baffle rings, the gases flowing from the combustion chamber are impelled to take a tortuous path, as indicated by the arrows in Fig. 1, so as to flow through the relatively restricted space surrounding the baffle disks which increases the velocity of the gases and causes them to impinge upon the muffle tubes at a sharp angle, the condition most conducive to the transfer of heat from the gases to the tubes.

The open discharge end of the kiln is enclosed by a hood 40 providing a passage 40a for the escape of cement clinker from the kiln, and through this hood extends a burner pipe 41 in a direction axially of the kiln for directing a long hot flame into the kiln.

Figure 6:
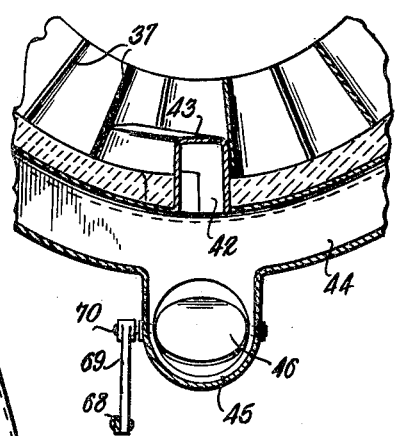
Figure 6 is a detail cross-sectional view of the kiln taken on the lines 6—6 of Fig. 5.

In order to prevent damage to the muffle tubes due to an excessive rise in temperature, such for example as may follow from temporarily arresting the feed of material through the kiln or by the building up of rings upon the inside of the kiln which retards the flow of material, there are provided through the wall of the section 1b of the shell constituting the combustion chamber a series of ports 42, best shown in Figs. 5 and 6, located at circumferentially spaced intervals about the shell. These ports are reinforced by sleeves 43 extending from the outer circumference of the shell through its refractory lining to the interior of the kiln where they are directed rearwardly against the inner circumference of the lining.

Surrounding the shell 1 so as to enclose the ports 42 is a stationary casing 44, this casing being sealed against the atmosphere except for an air admission duct 45 adapted to be opened and closed by a butterfly valve 46 pivoted therein. When the valve is opened cool air from outside the kiln enters the kiln through the ports 42 to dilute and reduce the temperature of the combustion gases in the kiln. The valve 46 is automatically controlled by a thermocouple 47 extending through the wall of the kiln so as to project into the interior of the kiln at a location adjacent but just forwardly of the rear end of the section 1a of the kiln carrying the muffle tubes. As represented in Fig. 5 the end of the thermocouple exteriorly of the shell 1 is connected by wires 48 to two collector rings 49 extending about but insulated from the shell. A stationarily supported trolley 50 having shoes 51 slidably engaging the collector rings is connected by conductors 52 to a relay designated generally at 53.

Figure 7:
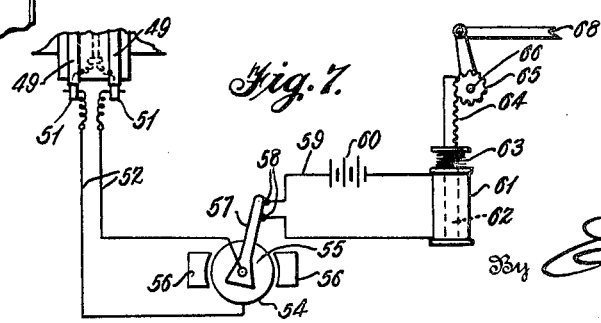
Figure 7 is a wiring diagram of the circuit which operates the valve of the automatic temperature control means.

One form of relay for controlling a secondary circuit to operate the valve 46 is schematically represented in Fig. 7. As shown in this figure the leads 52 from the pyrometer are connected to a coil 54 of a voltmeter 55, the coil being pivoted between the poles 56 of a permanent magnet. At one end of the coil is mounted a contact arm 57 adapted in one position of its swinging movement to engage and close the connection between a pair of contacts 58 in a secondary circuit constituted of a conductor 59. This secondary circuit includes a source of electrical energy 60 and a winding of a solenoid 61. A soft iron plunger 62 is adapted to slide within the solenoid but is held normally projected beyond the solenoid by a coil spring 63.

A rack bar 64 is fastened to the end of the plunger and this rack bar engages a pinion 65 keyed to shaft 66. To this shaft is fastened a rocker arm 67 which latter is connected by a link 68 (Fig. 5) to a lever 69 fastened to a rock shaft 70 on which is secured the valve 46. Thus when the temperature within the kiln increases to such an extent as to induce a current in the thermocouple circuit sufficient to rock the coil 55 to bring contact arm 57 into bridging engagement with the contacts 58, then the secondary circuit is completed which energizes the solenoid 61. Energization of this solenoid draws the plunger 62 inwardly against the action of the coil spring 63. The pinion 65 is then rotated by rack bar 64 to open the valve 46 through the train of linkage comprising rocker arm 67, link 68 and lever 69. When sufficient fresh air enters the kiln through the ports 42 to restore its temperature to normal, the contact arm 57 breaks its connection with contacts 58. This opens the secondary circuit 59 permitting the coil spring 63 to restore the solenoid (and hence through the linkage train the valve 46) to its normal closed position. In this way the valve is opened or closed according to the temperature conditions within the kiln.

In the operation of the rotary kiln described above, the mixture of crushed limestone and clay or shale suitable for the production of cement clinker is fed from the hopper 17 downwardly into the spout 23 and thence through the spout into the space provided by the tapered casting between the front header 7 and the cover plate 12. Here the material is lifted by the blades 11 and directed into the open ends of the muffle tubes 30 located in the section 1a constituting the conditioning chamber. As the individual streams of material progress through the muffle tubes and brush over the entire inner circumference of the tubes upon each rotation of the kiln, they rapidly absorb the heat transmitted through the comparatively thin walls of the tubes from the combustion gases which in their tortuous path of travel through the kiln repeatedly impinge upon these tubes. By the time the material has reached the discharge ends of the tubes its temperature has increased to such a point that coalescence occurs between the smaller particles of material and the larger particles. Therefore when the streams of material debouche from the tubes into the combustion chamber, the size and weight of the particles comprising the mix are sufficient to prevent their being blown out of the kiln by the strong draft of combustion gases.

The helical blades 37 located within the transition section 1c of the kiln serve during rotation of the kiln to remove the material spilling from the muffle tubes and deliver it into the combustion chamber. In the continued movement of the material through the combustion chamber, it is exposed directly to the intense heat of the combustion gases and the flame from the burner pipe 41 and ultimately reduced to cement clinker. The clinker issues from the lower end of the kiln through the hood 40.

As will be apparent the large heating surface provided by the muffle tubes, which may be of any heat resistant metal capable of withstanding high temperatures, results in an efficient abstraction of heat from the combustion gases flowing counter-current to the travel of the material. The heating of the material is rendered still more effective by reason of the baffles 38 and 39. As the gases from the combustion chamber pass into the conditioning chamber at the forward end of the kiln, they encounter the baffles located at spaced intervals throughout the conditioning chamber which serve to restrict the passage of the gases, and hence increase their velocity, and additionally act to deflect the gases traveling at high velocity back and forth across the muffle tubes and at approximately right angles thereto so as to thereby increase the amount of heat given up by the gases to the tubes. Experiment has shown that the combustion gases entering the conditioning chamber at a temperature of approximately 1700 degrees F. are cooled down to approximately 350 degrees F. upon leaving this chamber through the sleeve 9, the difference of 1300 degrees representing the heat given up to the material contained in the muffle tubes. Not only may rotary kilns built in accordance with the present invention be made considerably shorter than the open type rotary kilns now in common use, but as a consequence, the time for passing a charge of material through the kiln is likewise materially reduced.

As will be apparent from Fig. 1, the receiving compartment at the forward end of the kiln with which the inlet ends of the muffle tubes communicate is closed to the atmosphere and sealed against combustion gases as material is delivered thereinto through the spout 23. By thus isolating the material from the atmosphere and from the combustion gases throughout its preliminary heating stage clinker of improved quality is obtained, probably due in some part at least to the preservation of the relative proportions of the cement mix by preventing the loss or segregation of the fine dust. Furthermore, when limestone alone is being treated in the kiln, the large quantity of comparatively clean $CO_2$ gas evolved in the muffle tubes may be recovered as a commercial by-product of the calcining operation.

If for any reason the feed of material through the tubes is stopped, the thermocouple 47 in the conditioning chamber, in response to the increased temperature of the combustion gases flowing therein, operates to open the valve 46, in a manner which has already been explained, to allow cool air from the outside to enter the kiln through the ports 43 and thus lower the temperature within the kiln. This protects the thin-walled muffle tubes which might otherwise distort or rupture under too intense heat. Also the automatic temperature control is useful when the run of the kiln is first started and before the feed of the material has been regulated to conform to the intensity of the burner flame. Any other suitable form of thermostat than the one described above may be employed for operating the valve 46.

An increased flow of combustion gases is attained by operation of the fan 27 in circuit with the offtake flue 26, and the flow of the gases may be regulated by varying the speed of this fan. The caps 34 on the discharge ends of the muffle tubes shield the material spilling therefrom from the full effect of the strong current of gases while providing a restricted opening for the discharge of material into the combustion chamber.

By forming the muffle tubes of sector shape in transverse cross-section greater strength and resistance to deformation is attained. Also by utilizing tubes of this shape increased heating surface is obtained over that afforded by tubes of the conventional circular shape spaced corresponding distances apart. During revolution of the tubes with the kiln, a gentle tumbling action of the material, resulting from the shape of the tubes, contributes to the uniform heating of material within the tubes.

While the preferred form of kiln described above and illustrated in the drawings is composed of sections of different diameters, this is not essential and if necessary or desirable the kiln may be made of a single overall diameter throughout, or even of tapered form throughout the entire or major portion of its length.

The invention may be embodied in other specific forms without departing from the spirit or essential characteristics of the invention, and the present embodiment is therefore to be considered as illustrative and not restrictive, and all changes which come within the meaning and range of equivalency of the claims are therefore intended to be embraced therein.

I claim:

1. A rotary kiln arranged for rotation about an inclined axis, said kiln having a forward section constituting a conditioning chamber and a section of smaller diameter constituting a combustion chamber, a series of laterally spaced muffle tubes open at both ends extending throughout the conditioning chamber, said muffle tubes having comparatively thin metal walls, means for rotating said kiln, header plates fastened to and closing inlet and outlet ends of the conditioning chamber, and being provided with openings for passing the ends of said tubes, radially disposed baffles located at spaced intervals throughout the conditioning chamber, a hood for closing the outlet end of the kiln, a burner pipe projecting through said hood in a direction longitudinally of the kiln for directing a flame within the combustion chamber, an annular member secured to the inlet end of the kiln in advance of the conditioning chamber and providing in conjunction with the front header plate a closed compartment in communication with the forward ends of the muffle tubes, a spout for delivering material into said compartment, inclined lifting blades for directing material from said compartment into the muffle tubes, an offtake flue communicating with the kiln rearwardly of the header plate for the combustion gases passing out of the kiln, and means for withdrawing the combustion gases from the kiln through said flue.

2. A rotary kiln having different diameters connected by a tapered transition section, the forward section constituting a conditioning chamber being of larger diameter than the rear section constituting a combustion chamber, a series of muffle tubes extending lengthwise through the conditioning chamber, means for continuously passing material through the muffle tubes, and a burner pipe for directing a flame within the combustion chamber whereby the combustion gases flow counter-current to the travel of the material within the muffle tubes, the effective cross-sectional area of the conditioning chamber exclusive of the space occupied by the muffle tubes corresponding approximately to the cross-section of the combustion chamber.

3. A rotary kiln having sections of different diameters connected by a tapered transition section, the forward section constituting a conditioning chamber being of larger diameter than the rear section constituting a combustion chamber, a series of muffle tubes extending lengthwise through the conditioning chamber, means for continuously passing material through the muffle tubes, impeller blades located upon the interior of the transition section adjacent the discharge ends of the muffle tubes, and a burner pipe for directing a flame within the combustion chamber.

4. A rotary kiln having a series of muffle tubes extending longitudinally therein for conducting material through the kiln, means for the admission of air into the interior of the kiln from externally of the kiln, and means for automatically rendering said air admission means operative or inoperative responsive to temperature conditions within the kiln.

5. A rotary kiln having a series of relatively thin-walled muffle tubes extending longitudinally therein for conducting material through the kiln, means for heating the interior of the kiln, a port through the wall of the kiln for the admission of air into the interior of the kiln from externally of the kiln, a casing surrounding the kiln and in communication with the port, a valve for admitting air into the casing and means responsive to temperature conditions within the kiln for actuating the valve.

6. A rotary kiln having a series of muffle tubes extending longitudinally therein throughout a portion of the length of said kiln for conducting material through the kiln, said tubes being of relatively thin metal and liable to distortion under high temperatures, means for heating the interior of the kiln, a port through the wall of the kiln, a closed stationary casing surrounding the kiln and in communication with the port, a valve for admitting air into said housing and thermostatic means responsive to temperature conditions within the kiln for actuating the valve.

7. A rotary kiln having a series of muffle tubes extending longitudinally therein throughout a portion of the length of said kiln for conducting material through the kiln, means for introducing material into the forward ends of said muffle tubes and caps projecting outwardly from the outlet ends of said muffle tubes and being tapered inwardly for partially closing the ends of said muffle tubes.

8. A rotary kiln having a series of muffle tubes extending longitudinally therein throughout a portion of the length of said kiln for conducting material through the kiln, means for introducing material into the forward ends of said muffle tubes and caps upon the outlet ends of said muffle tubes for partially closing the ends of said muffle tubes, said caps being provided with tapered discharge spouts eccentrically and angularly disposed with respect to the longitudinal axis of said muffle tubes.

9. A rotary kiln comprising a conditioning chamber and combustion chamber and a series of muffle tubes made of metal extending longitudinally through the conditioning chamber, said muffle tubes being of generally sector shape in transverse cross-section.

10. A rotary kiln comprising a conditioning chamber and combustion chamber and a series of muffle tubes made of metal extending longitudinally through the conditioning chamber, said muffle tubes being of generally sector shape in transverse cross-section and provided with helical vanes adjacent their inlet ends.

11. In a rotary kiln of the type arranged for rotation about a generally horizontal axis and having means for feeding material into the forward end of the kiln and burner means for firing the rear end of the kiln, a receiving chamber for the material located at the forward end of the kiln and sealed against the combustion gases within the kiln, a nest of muffle tubes extending longitudinally through a minor portion only of the length of the kiln said tubes opening at one end into the receiving chamber and at their other end into the kiln and baffles located at spaced intervals longitudinally of the kiln in the section occupied by the muffle tubes for deflecting the combustion gases passing through the kiln across the tubes in a direction approximately normal thereto as the gases flow countercurrent to the travel of the material within the tubes.

RICHARD D. CHEESMAN.